(12) United States Patent
Handler

(10) Patent No.: US 9,835,272 B1
(45) Date of Patent: Dec. 5, 2017

(54) EXTENDER FOR CABLE RUN SUPPORT HOOK

(71) Applicant: Jordan Handler, Rye Brook, NY (US)

(72) Inventor: Jordan Handler, Rye Brook, NY (US)

(73) Assignee: MONOSYSTEMS, INC., Rye Brook, NY (US)

( * ) Notice: Subject to any disclaimer, the term of this patent is extended or adjusted under 35 U.S.C. 154(b) by 0 days.

(21) Appl. No.: 15/239,105

(22) Filed: Aug. 17, 2016

(51) Int. Cl.
*F16L 3/26* (2006.01)
*H02G 3/04* (2006.01)
*F16L 3/223* (2006.01)

(52) U.S. Cl.
CPC ............... *F16L 3/26* (2013.01); *F16L 3/223* (2013.01); *H02G 3/0406* (2013.01)

(58) Field of Classification Search
CPC .... F16L 3/26; F16L 3/223; F16L 3/23; H02G 3/0406; H02G 3/263; H02G 3/0437
USPC ............................................. 248/49, 58, 68.1
See application file for complete search history.

(56) References Cited

U.S. PATENT DOCUMENTS

| | | | | | |
|---|---|---|---|---|---|
| 1,936,079 | A * | 11/1933 | Belding | ................ | E04D 13/068 248/65 |
| 3,941,412 | A * | 3/1976 | Carpenter | ............. | F16L 3/1226 248/60 |
| 6,224,025 | B1 * | 5/2001 | Alvarez | .................... | F16L 3/11 24/339 |
| 6,283,158 | B1 * | 9/2001 | Botsolas | ................. | F16L 35/00 138/107 |
| 7,677,505 | B2 * | 3/2010 | Deichman | ............. | F16L 3/1008 138/106 |
| 7,837,156 | B1 | 11/2010 | Handler | ........................ | 248/58 |
| 7,939,759 | B2 * | 5/2011 | Henry | ................. | H02G 3/0406 174/101 |
| 8,297,561 | B1 * | 10/2012 | Montplaisir | ......... | F16L 59/135 248/542 |
| 8,763,960 | B1 * | 7/2014 | Moore | .................... | F16L 3/133 174/40 R |
| 8,840,071 | B2 * | 9/2014 | Oh | ........................ | F16L 3/1075 248/58 |
| 8,919,704 | B2 * | 12/2014 | Lee | ........................... | F16L 3/26 248/58 |
| 2010/0038129 | A1 * | 2/2010 | Handler | .............. | H02G 3/0431 174/481 |

\* cited by examiner

*Primary Examiner* — Anita M King
(74) *Attorney, Agent, or Firm* — Ostrolenk Faber LLP

(57) ABSTRACT

Each spaced apart support for a cable run in a preferred form includes a hook having a relatively narrower width along the direction of the cable run. A respective extender attached above each hook has a greater length along the cable run than the width of the support in the direction of the cable run, and the extenders thereby provide extended support for cable resting on the extenders along the cable run. Each extender has a slight downward curvature. The opposite ends of each extender have a sharp downward curvature so that the extenders will support resting cable passing over the supports and avoid damage to the cable passing off the extender. A plurality of the supports may be spaced apart at a greater interval such that the longitudinal ends of adjacent extenders are spaced apart defining an acceptable length gap over which the cable run passes.

11 Claims, 3 Drawing Sheets

EXTENDER FOR CABLE RUN SUPPORT HOOK

BACKGROUND OF THE INVENTION

The present invention relates to supports for a cable run, which support electric power cables and/or data cables, wires, or the like over an extended length and generally horizontal run from power sources, and/or data sources to apparatus which is connected to a respective power source or data source. For example, and without limitation, the cable support may extend along and/or above or behind a ceiling or a wall between the source and the apparatus connected to it. Herein, one word cable includes cables, wires or other elongate carriers of power data or electricity.

One type of support for a cable run is a generally continuous tray or raceway, usually comprised of connected segments along the path of the supported cables, on which cables rest while extending between the cable supply source and the apparatus supplied by each cable. The present invention does not concern such a tray or raceway.

Another device for supporting cables extending on a generally horizontal run are a series of separate cable supports spaced along the cable run. Examples are cable support hooks spaced apart along the cable run and on which the cables are supported. An example of a cable support that is narrow in the cable run direction is a cable support hook disclosed in U.S. Pat. No. 7,837,156 by the Applicant/Inventor hereof, entitled "Cable Support Hook", and incorporated herein by reference. Other cable supports that are narrow in their width with reference to the length of the cable run are known in the art. The support provided for a cable run by hooks is generally provided only at the narrow width of each of the hooks in the cable run direction. The usually narrow width of the hooks and the relatively large spacing between adjacent hooks defines long stretches of unsupported cables in the cable run extending between adjacent hooks. Those long stretches and the weight and length of the cables are likely to strain the cables, which could weaken or damage them. Also, long unsupported stretches of cable may cause undesirable bending of the cable along its run. An unsupported cable may impinge on other cables or against other objects along the cable run.

A device that will effectively extend the support for cables along their cable run between supports provided by individual hooks or other localized supports and which is an uncomplicated device and may use less material than a cable tray and would provide additional support for cables, at a possibly reduced expense and requiring fewer installation steps, would be preferable, versus other devices used for supporting cable in an extended cable run.

SUMMARY OF THE INVENTION

It is an object of the invention to support cables along extended length sections of their cable run.

Another object of the invention is to extend the lengths of separated cable supports along the cable run.

Other objects of the invention are to reduce strain on and excessive and too sharp bending of the cable along the cable run and to provide possible other benefits from elongated support of cables over the cable run.

A device according to the invention which is intended to achieve the above objects and others comprises a respective extender extending in the length of the cable run. The extender is in turn supported on a narrower width cable support hook or other support device, to which the extender is preferably anchored. The greater lengths of the extenders, as compared with the widths of the cable supports, such as a cable support hook, enable a greater length of the cable between the adjacent cable supports to be supported on each extender and provides attendant benefits of reduced strain on the cable, reduced sagging of the cable, and reduced need for stronger cables, which may otherwise be achieved, for example, by thicker cables, stronger metal of the cables, and thicker sheathing on the cables, etc., which also avoids need for a designer or user of a cable support system to provide individual cable support hooks or other supports spaced at closer intervals and saves cost and installation steps by requiring installation of fewer separated cable supports.

A cable extender, generally in the form of a tray, for example, may be supported on a cable support hook, which is an example of a support element on which the extender is itself supported, including a cable support hook disclosed in U.S. Pat. No. 7,837,156, incorporated herein by reference.

The extender may have an upstanding flange, or the like, at each of its opposite lateral edges and the flanges, together with the base of the extender, define a passageway through the extender for cables. The flanges may be substituted by upstanding posts, flanges that are short in the length direction, edge guides, etc.

To ease passing the run of cables through a row of the extenders, the opposite axial ends of each extender may be curved downward, so as not to interfere with installation of cables by passing them along the extenders in the cable run.

The entire extender may have a gradual curvature around an axis transverse to the extender. This prevents the support for the cable and, as a result, the cable having a sharp bend or creating strain at the longitudinal ends of each extender.

Because of the length of support in the cable run direction for the cables which is provided by the extenders, versus the length in the cable run direction of the narrower support hooks, or of other narrower supports, the hooks or other supports can be installed further apart along the cable run, such that fewer of the hooks or like supports may be needed for a particular length of the cable run. This reduces the number of cable support installation procedures that need be performed and may reduce the distance between successive supports for the cable versus not providing greater length by the extenders. This enables minimizing to a desirable extent unsupported spans of cable between adjacent hooks or supports.

Holes may be introduced into the support base of the extender for drainage of rain, moisture, etc. The extender might have one or more openings through its base for cable or wire turn down to an apparatus that is to be served by a cable that is turned down below an extender.

Other objects and features of the present invention are shown in the attached drawings and the description herein of a preferred embodiment of the extender.

DESCRIPTION OF AN EMBODIMENT

Figure 3:
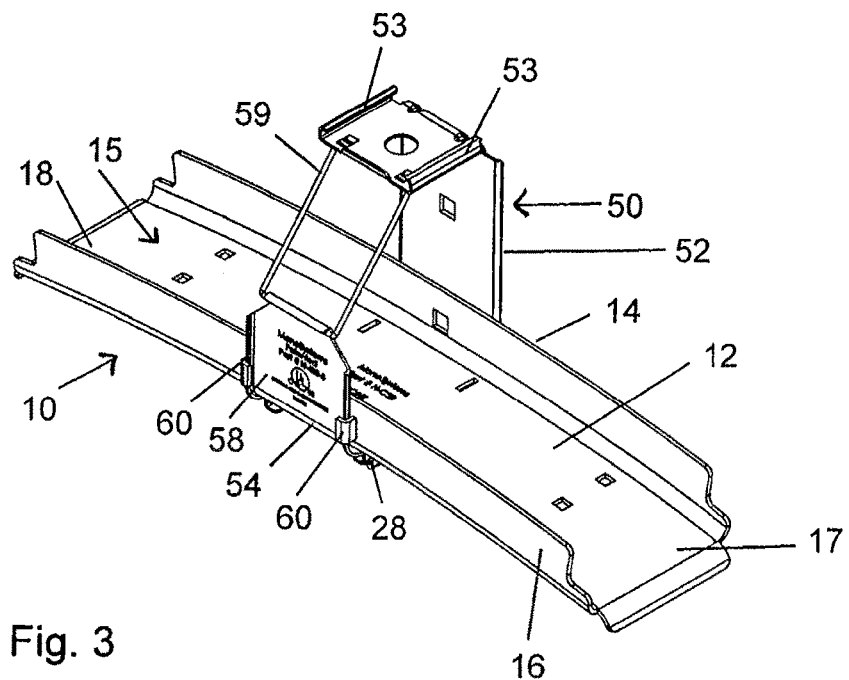
FIG. 3 is a front, perspective view of the extender of FIG. 1 shown attached to an embodiment of a cable support hook.

The drawings show one preferred embodiment of a cable supporting extender 10 according to the invention. As shown in FIG. 3, the extender is configured so as to be non-movably affixed to a cable support in the illustrated form of a hook 50, such as the hook disclosed in U.S. Pat. No. 7,837,156, incorporated herein by reference. The extender 10 may be used with other configurations of cable supports.

The extender 10 has a base 12 on which cables, wire, conduit, et al of a cable run is rested. Herein, each is referred to as cable. Along its lateral sides, the base 12 has a rear upstanding flange 14 and a front upstanding flange 16, which together with the base 12 define an open top channel 15 through which supported cables may extend.

Typically, a cable is threaded over its supporting cable tray, support hooks or other support elements, etc. and so past an entry end 17 and then past an exit end 18 of the extender.

Figure 4:
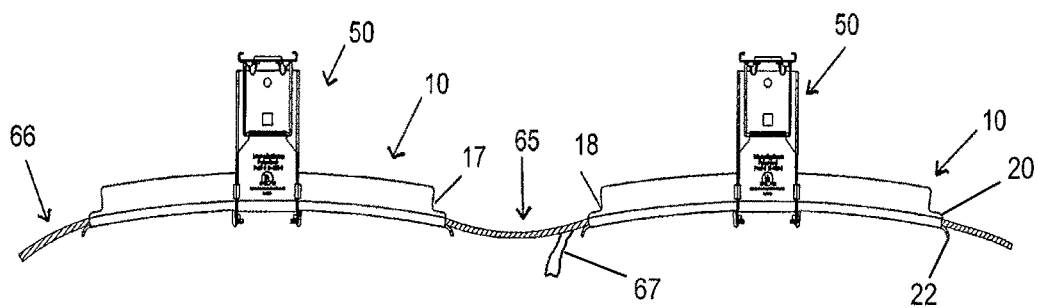
FIG. 4 illustrates one or more cables or conduit on a longitudinal cable run defined by a plurality of cable support hooks to which respective extenders of the present invention are attached.

Each opposite lateral end region of the base 12 terminates with a curved downward section 20 curved around an axis transversely across the extender, and that section 20 terminates at a respective longitudinal edge 22. Due to that curvature of the extender, curves out of the path of a cable 67 passing through the extender and avoids a sharp edge 22 of the extender and thereby prevents a cable of which a segment 67 extending off the extender is seen in FIG. 4 from turning sharply downward against an edge 22 when its support at the end of the extender turns down.

Figure 1:
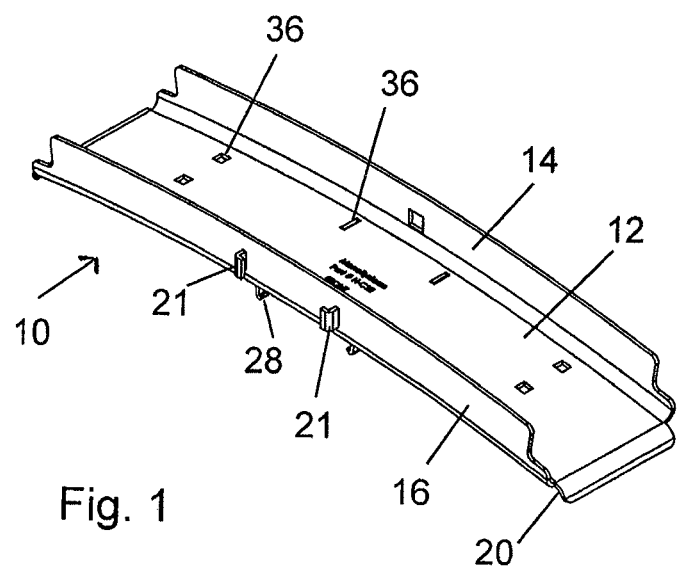
FIG. 1 is a perspective view of an embodiment of the invention of an extender for support for a cable run.
Figure 2:
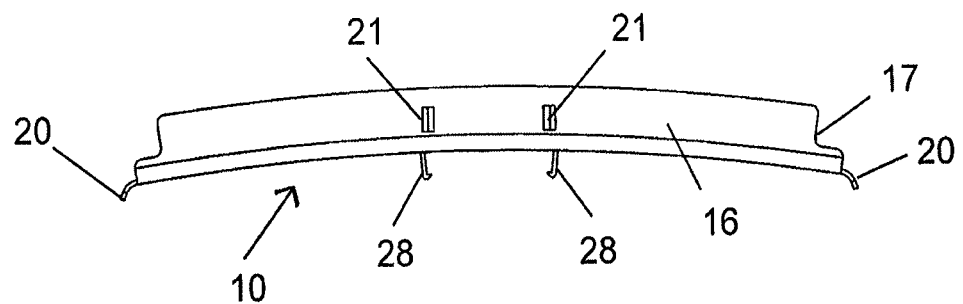
FIG. 2 is a front view of the extender of FIG. 1.

In FIG. 2, the front side 16 of the extender 10 has a pair of inturned attachment clips or fasteners 21, which are turned toward each other and define a path through which the upstanding front wall 58 of a generally "J"-shaped hook 50 may be received by sliding the front wall 58 of the hook through those clips or fasteners 21.

In FIG. 3, at the underside of the extender 10, a pair 28 of rail support channels are formed, which guide the extender 10 onto support rails on the bottom of hook.

The extender 10 has an arcuate, slightly curved base 12, shaped so that it is curved around an axis transverse to the direction of extension of the extender. The gradual curve supports the cables that pass over the extender, and somewhat flexible cables will settle on the base 12. The extender is not so sharply curved as to terminate contact between the cables and the base 12 of the extender before the cables reach either end 17, 18 of the extender. Cables that are supported over a longer distance in their cable run reduce strain on the cables. This should be better for the condition of a cable than supporting the cable on the much narrower base of a cable support hook.

The channels 28 beneath the base of the extender 10 receive a bottom support of the hook and enable the extenders to be slid onto the hook.

Optionally, the extender may have small slots 36 in the base 12 which allow moisture or water to exit the top, operative side of the base 12.

A support hook 50 and the extender 10 are attached, as shown in FIG. 3. The support hook has a generally "J-shape". That includes a tall rear leg 52 by which the hook is attached to the rear flange 14. The rear leg 52 is supported on another hook supporting fixture (not shown) by the clips 53 at the top of the hook. The "J" hook has a base element 54 that extends under the extender base 12. At the front flange 16 of the extender, the front leg 58 of the "J" hook extends upwardly and it is captured by the inwardly turned clips 21 of the extender which engage the front leg of the hook to hold it. A harness 59 joins the legs 52, 58 for maintaining the cable pathways. In this manner, the hook is secured to the extender, fixing the position of the extender on the hook and preventing movement, except for initial attachment of the extender to the hook and later separation thereof. One possible embodiment of a hook to which the extender is attached is illustrated in FIGS. 3 and 4. If other support arrangements for extenders are provided, the shape of the hook or another cable support and of the extender to be supported on the cable support could be adjusted so that the extender is fixed on the support.

FIG. 4 shows an array of two of the cable supports, here "J"-hooks 50, and two of the extenders 10 on the supports. There is no limit to the number of supports and the respective extenders along the extended cable run. The spacing or gap 65 between the supports hooks 50 is selected for adequately supporting the cables 66 against sagging or being under strain due to too much cable weight between locations at which the cable is supported. Extenders may assist in this. First, if there is a set maximum distance of separation between one support element 50 that supports cables and a gap 65 to a neighboring support element that supports cables, the additional distance from the original support of cables, provided by the extensions 10 beyond one or both sides of the hook support 50 for the extender, would permit the hook supports to be initially installed further apart with the extenders in place. The opposing ends 17, 18 of two extenders supported on two adjacent hook supports could be spaced apart the same distance as neighboring hook supports without extenders. But, the hook supports may be further apart when extenders are used, because the extenders would be separated over the set distances between the two support locations noted. With shorter distances of unsupported lengths of the cable, there will be less weight of cable between two elements that support the cable, less strain on the cable and/or permitting thinner or physically weaker cable or cable shielding than an arrangement without the extensions.

For example, the current United States National Electrical Code, at the time of the filing of this application, requires twelve inches separation on a center support of cables in a solar array installation. If a hypothetical long support extender of twelve inch length were placed on a support hook, it would extend six inches in both directions from the central location of the initial support hook. The distance between the installed support hooks can be increased to the extent that neighboring extenders extend toward each other to be spaced apart a distance specified in the code. This will reduce the number of support hooks or the like necessary for an installation, reducing cost and reducing the amount of installation work.

Figure 5:
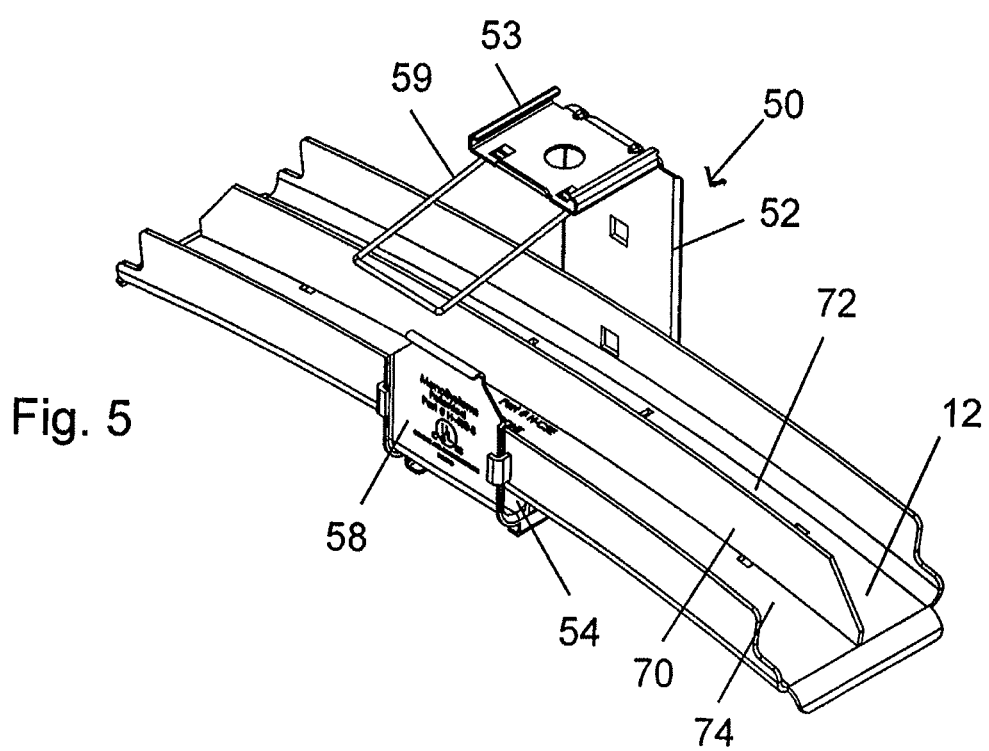
FIG. 5 illustrates an alternate embodiment of the extender.

Referring to FIG. 5, especially if there are different types of cable or wires extending over the same cable pathway and over the extenders 10, each extender might be provided with an upstanding, laterally inwardly located divider 70 or a set of such dividers extending in the direction of the cable run. Each divider defines respective pathways 72, 74, e.g. for one type or group of cable at one side of a divider and for another type or group of cable at the other side of the divider. The presence of a divider on an extender without there being need for separating types or groups of cables does not interfere with the cable supporting structure of the extenders or change the manner in which it functions.

The shapes, heights and widths of the cable support hooks or other cable supports to which the extenders are attached and the configuration of the extenders will cause the supports and the extenders to not interfere with other structures linking one hook with another hook at a support location as shown in the aforesaid U.S. Pat. No. 7,837,156, incorporated by reference.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. A combination comprised of an extender with a cable support for use for supporting a cable run of at least one or more cables, the combination comprising:
   the cable support is configured for supporting the at least one cable or more cables passing over the cable support along the cable run, the cable support having opposite lateral sides defining a narrower width in the path of and in the direction of the cable run;
   the extender is attached to the narrower width cable support, the extender defining an extended pathway for the cable run at both lateral sides of the cable support, wherein the at least one or more cables passing over the cable support may lie on the extender along the cable run, the extender having a greater length along the cable run than is provided by the narrower width of the cable support to which the extender is attached;
   the extender has a base over which the cable run passes and on which the at least one or more cables may rest on the extender;
   the narrower width of the cable support comprises a support base of the cable support disposed beneath and supporting the base of the extender;
   the cable support comprises a hook which includes the support base of the cable support;
   the hook comprises a "J" hook including the support base of the cable support beneath the extender base and a first upstanding leg of the hook extending up past the extender;
   the extender additionally has separated apart, upstanding flanges extending along the base which define sides for the at least one or more cables of the cable run that are supported on the base of the extender; and
   the first leg of the "J" hook being attached to one of the flanges at a side of the extender.

2. The combination of claim 1, wherein the hook includes a second upstanding leg extending up past the other flange at an opposite lateral side of the extender from the first leg of the hook.

3. A combination comprised of an extender with a cable support for use for supporting a cable run of at least one or more cables, the combination comprising:
   the cable support is configured for supporting the at least one cable or more cables passing over the cable support along the cable run, the cable support having opposite lateral sides defining a narrower width in the path of and in the direction of the cable run;
   the extender is attached to the narrower width cable support, the extender defining an extended pathway for the cable run at both lateral sides of the cable support, wherein the at least one or more cables passing over the cable support may lie on the extender along the cable run, the extender having a greater length along the cable run than is provided by the narrower width of the cable support to which the extender is attached;
   the extender has a base over which the cable run passes and on which the cable at least one or more cables may rest on the extender;
   the narrower width of the cable support comprises a support base of the cable support disposed beneath and supporting the base of the extender;
   the cable support comprises a hook which includes the support base of the cable support; and
   attachment devices at least at the extender base and at one of the flanges of the extender, the attachment devices shaped and positioned for attaching the extender to the hook.

4. The combination of claim 3, wherein the extender additionally has separated apart, upstanding flanges extending along the extender base which define sides of the base of the extender for containing the at least one or more cables of the cable run that are supported on the base of the extender.

5. The combination of claim 3, wherein the extender along the length thereof has a smaller degree of curvature downward at, and at the lateral sides of, the cable support to which the extender is attached and along the cable run, the curvature of the extender being shaped so that the at least one or more cables on the cable run past the extender may lie on the extender up to the entire length of the extender and the cable run may be supported over up to the entire length of the extender along the direction of the cable run.

6. The extender of claim 3, further comprising a plurality of holes through the base of the extender for permitting passage of water and moisture through the extender base.

7. The combination of claim 3, further comprising the extender having opposite free longitudinal end regions along the direction of the cable run, and the longitudinal end regions ending in respective opposite free longitudinal edges;
   at least one of the opposite free longitudinal end regions being rounded curved downwardly around an axis across the extender so as to not present the respective free longitudinal edge of the extender to at least one or more cables extending along the cable run or to a cable extending down from the extender after extending past one of the free longitudinal ends.

8. The combination of claim 3, wherein the extender along the length direction thereof between the free longitudinal edges thereof has a small degree of curvature downward around an axis across the extender, and at both lateral sides of the cable support to which the extender is attached and along the cable run, the curvature of the extender being shaped so that the at least one or more of the cables on the cable run past the extender may lie on the curvature of the extender and be supported over a length direction of the extender along the path of the cable run.

9. The combination of claim 3, wherein the extender has a divider extending along the length of the base between lateral edges of the base of the extender, and the divider being located as to define separated pathways along the cable run at each side of the divider for separating cables to run at a respective side of the extender divider.

10. A cable run combination comprising:
    a plurality of the combinations of the cable support and the extender of claim 3, wherein each of the combinations of the cable support and the extender comprises at least one of the supports which supports at least one or more of the cables of a cable run that is extending past the at least one of the supports, wherein the supports are arrayed at spaced intervals along the cable run;

a respective one of the extenders on each of the cable supports of the cable run;

each support being of a narrower width than the length of the respective extender for the support in the direction of the cable run; and the extender on each of the supports being of greater length in the direction of the cable run than the width of their respective supports along the cable run; and the supports being so spaced apart along the cable run and each of the extenders being of such length that with the extenders attached to the respective supports, there are gaps without any support for the cable on the cable run between longitudinal end regions of the neighboring extenders along the cable run.

11. The cable run combination of claim 10, further comprising at least one of the extenders having opposite longitudinal end regions along the direction of the cable and the longitudinal end regions ending in respective opposite free longitudinal edges;

at least one of the opposite longitudinal end regions being rounded curved downwardly around an axis across the extender so as to not present the respective free longitudinal edges of the extender to at least one or more cables extending along the cable run or to a cable extending down from the extender after extending past the at least one of the longitudinal end regions.

* * * * *